Patented Apr. 4, 1939

2,152,829

UNITED STATES PATENT OFFICE 2,152,829

FILM-FORMING COMPOSITION

Peter A. van der Meulen, New Brunswick, N. J., assignor to John R. Ditmars, New Brunswick, N. J.

No Drawing. Application August 24, 1935, Serial No. 37,654

5 Claims. (Cl. 134—12)

The invention herein disclosed relates to a film-forming composition of the type disclosed in my copending application Serial No. 680,975 (Patent No. 2,069,787, February 9, 1937) for Films and which is suitable for forming a film or coating sheet material such as paper and the like.

In my aforementioned application, there is disclosed a film-forming composition or emulsion containing a gelatin emulsion and a water-insoluble compound in a state of sub-microscopic dispersion throughout the emulsion which is suitable for forming a thin film either independently or as a coating for a sheet material, which film may be transparent or colored and may be polished to a high gloss. In producing the film as a coating, for example, the film-forming emulsion is applied to the sheet material, dried thereon and then polished to a high gloss by pressure contact with a highly polished surface such that the film partakes of the nature of the polished surface.

In the film-forming compositions similar to that of my aforementioned application, the gelatin is swelled in water. The amount of water used in preparing the emulsions is comparatively high in relation to the gelatin and in the formation of the film, this water must be removed from the emulsion. To form the film continuously, large and expensive drying equipment is required and it is a purpose of this invention to materially reduce the water content of the emulsion and thus decrease the cost of producing such films and coating sheet material with film forming emulsions of this character.

I have discovered that the water content of such emulsions may be reduced to a ratio of from one to five parts of water to each part of the base material which may consist of either gelatin or casein or an admixture of either of these in any proportion. At present it appears that the most satisfactory ratio of water to the base material (gelatin or casein) is between two and three parts of water to each part of the base material, preferably two and seven-tenths parts of water for each part of the base material. However, these proportions may alter with the conditions of manufacture, but the water content should be kept as low as consistent with good operation so as to decrease the drying time and temperatures.

A film-forming composition embodying this invention may be made up in accordance with the following example which will serve to illustrate the proportions of the various ingredients and the procedure followed: 200 gms. of gelatin is swelled by letting the gelatin soak in 400 cc. of water for several hours. Thereafter the mixture is heated on a water bath at a temperature between 125° and 135° F. While the gelatin is in the fluid state there is added to it 132 gms. of sulphonated oil, the mixture being constantly stirred while the sulphonated oil is being added. After the sulphonated oil has been added there is added slowly and with constant stirring 80 cc. of a molar solution of calcium nitrate and thereafter 40 cc. of butyl alcohol, the mixture being constantly stirred while the alcohol is added. Following the addition of the butyl alcohol there is added to the solution 20 cc. of phenl, a 5% solution. Just before the mixture is drawn out into a film or coated on a sheet material, the mixture is heated to a temperature between 125° and 130° F. and there may be added to the mixture a solution of 6 gms. of hexamethylene tetramine in about 20 cc. of warm water.

The substance designated as a sulphonated oil is a sodium neutralized sulphonated oil; for the purpose of the composition being described it is a sodium neutralized product of the reaction of 30% by weight of concentrated sulphuric acid (O. V.) and 70% by weight of castor oil. The reaction is carried out at a temperature below 35° C. and requires approximately five hours. Such a sulphonated mass contains approximately 8.5% combined sulphur trioxide ($SO_3$) and this product is treated with an equal quantity of water, thoroughly stirred and allowed to settle. The water is then drawn off. The oil is then neutralized with the proper quantity of caustic soda, 32° Bé. Any other sulphonated oil, such as olive oil, is suitable for the purpose, but a sulphonated castor oil is preferred. Likewise a potassium or ammonium neutralized sulphonated oil may be used.

The solution of calcium nitrate is made up by dissolving crystallized calcium nitrate in water. The quantities of water and nitrate are adapted to produce a solution of 1 gm. mole per liter. Other suitable salts of the alkaline earths such as calcium chloride, calcium acetate and similar barium salts may be used. These soluble salts of the alkaline earths are used for reacting with the sulphonated oil. The proper amount of calcium nitrate solution to be added may be determined in the following manner: 22 gms. of the sulphonated and neutralized castor oil is diluted with 50 cc. of water in a small Erlenmeyer flask, provided with a cork. The calcium nitrate solution is placed in a burette and added to the solution of the sulphonated oil, one-half cc. at a time.

The flask is shaken vigorously after each addition of calcium salt solution to cause foaming. It will be found that the addition of approximately 15 cc. of calcium salt solution will practically stop all foaming. This volume is read accurately and represents a measure of the calcium nitrate solution necessary to precipitate completely the sulphonated oil. From 90 to 95% of the quantity of calcium nitrate solution required for the complete precipitation of the sulphonated oil is then added to the coating solution. The result of the interaction of the sulphonated oil and the calcium nitrate solution is the production in the mixture of insoluble calcium salts and also the separation of free castor oil in the sulphonated oil, in an extremely fine state of dispersion, sub-microscopic dispersion, throughout the gelatin. The gelatin, and a small quantity of the remaining sodium salt of sulphonated oil, act as protective colloids to maintain the fine state of division of the oil and calcium salts. The same result can be obtained from the reaction of the sodium neutralized sulphonated oil with a soluble salt of any of the following metals: strontium, barium, zinc, cadmium, mercury, lead, aluminum, glucinum tin, bismuth, etc.

The butyl alcohol apparently serves two functions. During the coating process it lowers the surface tension of the water and thus promotes a spreading of the composition; it also aids in tying the film to a paper when the film-forming composition is used as a coating, acting as an additional bonding link between the paper and the coated film. Any one of the three isomers of butyl alcohol, primary, secondary or tertiary or a mixture of these, may be used.

The hexamethylene tetramine serves to harden the gelatin; formaldehyde may be used for this purpose. It is not an essential ingredient and may be dispensed with. However, the small quantity mentioned seems to produce a firmer film which has less tendency to squeeze in the process of smoothing the surface of the film.

The phenol (carbolic acid, U. S. P.) is simply a preservative. Beta naphthol or any other good preservative, which will prevent bacterial growth, may be substituted for the phenol.

As previously stated, casein may be used in place of the gelatin as the base material of the emulsion. Likewise casein and gelatin may be mixed to form the base material. A suitable composition containing casein alone may be made in the following manner: 200 cc. of water are added to and mixed with 200 gms. of casein and allowed to soak for a period of about one-half hour or longer. A mixture of 25 gms. of borax and 200 cc. of water is heated and added to the casein and the mixture is then heated on a water bath to approximately 160° F. The mixture while on the water bath is stirred until the casein solution appears homogenous. There is then added to the mixture 132 gms. of sulphonated oil followed by 80 cc. of a molecular solution of calcium nitrate, 50 cc. of butyl alcohol and 100 cc. of water. These are added successively, the mixture being constantly stirred during the addition of these elements. Just before the mixture is drawn out into a film or added as a coating to a sheet material there is added to the emulsion either formaldehyde or hexamethylene tetramine. For example, 6 gms. of hexamethylene tetramine and 20 cc. of water may be added to the mixture.

Either of the two emulsions described above, or an emulsion in which casein and gelatin together form the base material, such as emulsion being preferably made by first forming an emulsion containing gelatin and an emulsion containing casein as described above and then mixing the two emulsions in any proportion desired, is readily drawn out into a film by any of the well known methods for forming films. It likewise may be added to a sheet material such as paper as a coating, preferably in a reverse roller coating machine. After the composition is drawn into a film either independently or as a coating on a sheet material, it is thoroughly dried and it may then be polished by calendering or preferably by pressure contact with a highly polished surface. It has been found that it is desirable to "wet back" the film or coating before polishing. A satisfactory solution for wetting back the film is a solution containing casein and formaldehyde in water. The film is wet back with such a solution just prior to being pressed against a heated polished surface. When thus pressed against the polished surface, the surface of the film partakes of the nature of the polished surface against which it is pressed, that is, it is molded in accordance with that surface.

Films of this kind having various color effects can readily be made by adding dyes and metallic powders to the emulsion such as the aluminum and bronze powders.

It will be obvious that various changes may be made by those skilled in the art in the details of the procedure in making and the ingredients of the embodiment of the invention described above within the scope and principle of the invention as expressed in the appended claims.

I claim:

1. A composition for forming a continuous film and suitable for coating paper and the like, which composition comprises a base material selected from the group consisting of gelatin and casein, a water insoluble salt of a sulphonated vegetable oil in a state of submicroscopic dispersion throughout the composition and water in the ratio of from one to five parts for each part of the base material.

2. A composition for forming a continuous film and suitable coating paper and the like, which composition comprises a base material selected from the group consisting of gelatin and casein, water in the ratio of one to five parts for each part of the base material, and the reaction products of a water-soluble compound of a metal taken from the group consisting of the metals of the second to eighth groups inclusive of the periodic system and a sodium neutralized sulphonated vegetable oil in a state of submicroscopic dispersion throughout the composition.

3. A composition for forming a continuous film and suitable for coating paper and the like, which composition comprises a base material selected from the group consisting of gelatin and casein, water in the ratio of one to five parts for each part of the base material, and the reaction products of a water-soluble compound of a metal taken from the group consisting of the metals of the second to eighth groups inclusive of the periodic system and a sodium neutralized sulphonated vegetable oil in a state of submicroscopic dispersion throughout the composition.

4. A composition for forming a continuous film and suitable for coating paper and the like, which composition comprises a base material selected from the group consisting of gelatin and casein, water in the ratio of one to five parts for each part of the base material, and the reaction products of a water-soluble compound of a metal taken from the group consisting of the metals of the second to eighth groups inclusive of the periodic system and a sodium neutralized sulphonated castor oil in a state of submicroscopic dispersion throughout the composition.

5. A composition for forming a continuous film and suitable for coating paper and the like, which composition comprises a base material selected from the group consisting of gelatin and casein, water in a ratio of one to five parts for each part of the base material, and the reaction products of calcium hydroxide and a sodium neutralized sulphonated castor oil in a state of submicroscopic dispersion throughout the composition.

PETER A. van der MEULEN.